US006331587B1

(12) United States Patent
Geissler

(10) Patent No.: US 6,331,587 B1
(45) Date of Patent: *Dec. 18, 2001

(54) POLYVINYL ESTER DISPERSIONS AND METHODS FOR THEIR PREPARATION

(75) Inventor: Ulrich Geissler, Hochheim (DE)

(73) Assignee: Clariant GmbH, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/701,988

(22) Filed: Aug. 23, 1996

(30) Foreign Application Priority Data

Aug. 26, 1995 (DE) .............................. 195 31 515

(51) Int. Cl.$^7$ ........................................ C08L 19/02
(52) U.S. Cl. .................. 524/459; 524/503; 525/56; 525/57; 525/61; 526/202; 526/219.5
(58) Field of Search .................... 524/459, 503; 526/202, 219.5; 525/56, 61, 57

(56) References Cited

U.S. PATENT DOCUMENTS

| 3,532,658 | * | 10/1970 | Gintz | 524/459 |
| 3,668,165 | * | 6/1972 | Bergmeister et al. | 524/459 |
| 3,714,098 | * | 1/1973 | Rauterkus et al. | 524/459 |
| 4,139,509 | * | 2/1979 | Matsunga et al. | 524/459 |
| 4,256,636 | * | 3/1981 | Roos et al. | 260/192 |
| 4,260,713 | * | 4/1981 | Tanaka et al. | 526/204 X |
| 4,308,189 | * | 12/1981 | Moritani et al. | 524/459 |
| 4,489,192 | | 12/1984 | Shih et al. | 524/813 |
| 4,539,362 | * | 9/1985 | Davies et al. | 524/459 |
| 4,920,187 | * | 4/1990 | Kashihara et al. | 526/193 |
| 4,985,239 | * | 1/1991 | Yahagi et al. | 424/70 |
| 5,216,065 | * | 6/1993 | Coyler et al. | 524/459 |
| 5,284,900 | * | 2/1994 | Izubayashi et al. | 524/459 |
| 5,367,039 | * | 11/1994 | Yabuuchi et al. | 526/284 |

FOREIGN PATENT DOCUMENTS 32 39 091    4/1984  (DE) .

OTHER PUBLICATIONS

Sakota et al, "Preparation of Cationic Polystyrene Latexes in the Absence of Emulsifiers", Journal of Applied Polymer Science, vol. 20, pp. 1725–1733, 1976.

* cited by examiner

*Primary Examiner*—Judy M. Reddick
(74) *Attorney, Agent, or Firm*—Heller Ehrman White & McAuliffe LLP

(57) ABSTRACT

Polyvinyl ester dispersions which can be employed as binders in building materials, preferably in the form of redispersible plastics powders, are obtained by polymerization of at least one vinyl ester and optionally other monomers which can be copolymerized with vinyl ester, by use of water-soluble cationic azo initiator.

19 Claims, No Drawings

POLYVINYL ESTER DISPERSIONS AND METHODS FOR THEIR PREPARATION

BACKGROUND OF THE INVENTION

1. Field of the Invention

The invention relates to a process for the preparation of vinyl ester polymer dispersions which are stabilized with protective colloids and have a high solids content, to the so-prepared dispersions, and to the use of these dispersions, or of the dispersible dispersion powders obtainable therefrom by spray drying, for example, for modifying building materials.

2. Description of Related Art

For economic reasons, dispersions having the highest possible solids content should be prepared. However, this requirement has not been met to date for all types of dispersion. Thus, dispersions which are based on vinyl ester/(meth)acrylate and are stabilized with protective colloids tend toward dilatancy at high solids contents.

The use of cationic azo initiators in the preparation of emulsifier-stabilized dispersions is known in principle. DE-A 32 39 091 describes a process for the preparation of cationic styrene or acrylic ester latices in the presence of cationic comonomers using a cationic azo compound as an initiator. The solids content of the dispersions described in the examples is a maximum of 41% by weight.

U.S. Pat. No. 4,489,192 relates to curable cationic polymer lattices which are based on vinyl esters and monomers containing cationic quaternary ammonium groups and are prepared in the presence of a water-soluble cationic azo initiator, an aminothiol salt, and cationic and/or nonionic emulsifiers.

A publication by K. Sakota and T. Okaya (J. Appl. Polym. Sci. 20, 1725 (1976)) reports on the preparation of cationic polystyrene latices, 2,2'-azobis(2-amidino-propane) hydrochloride being employed as an initiator. Stable latices are obtained only if the cationic emulsifier dodecylpyridinium chloride is added or in the case of copolymerization with the cationic monomer dimethyl-aminoethyl methacrylate hydrochloride. The solids content of the dispersions described is less than 25% by weight.

SUMMARY OF THE INVENTION

An object of the present invention was to provide a process for the preparation of polymer dispersions which comprise vinyl esters and are stabilized with protective colloids. It is also an object of the invention to provide such dispersions and methods of using them.

These objects have been achieved by using water-soluble, cationic azo initiators. In particular, in accordance with the present invention there is provided a process for the preparation of a dispersion which comprises a homopolymer or copolymer of vinyl ester and is stabilized with a protective colloid that comprises polymerization of monomers comprising at least one vinyl ester of a linear or branched monocarboxylic acid having 2 to 12 carbon atoms and optionally further monomers which can be copolymerized with the vinyl ester, by use of a water-soluble cationic azo initiator in the presence of a protective colloid, at a preferred polymerization temperature of 40 to 90° C.

In accordance with further objects of the invention, there is provided a polymer dispersion which is stabilized with a protective colloid and has a solids content of at least 45% by weight, obtained by the process described above.

Further objects, features, and advantages of the present invention will become apparent from the detailed description of preferred embodiment that follows.

DETAILED DESCRIPTION OF PREFERRED EMBODIMENTS

The present invention relates to a process for the preparation of dispersions which comprise homo- or copolymeric vinyl esters and are stabilized with protective colloids, by polymerization of at least one vinyl ester and optionally further monomers which are copolymerizable with this vinyl ester, by means of water-soluble cationic azo initiators.

Any desired water-soluble cationic azo initiator or mixture thereof can be used. Preferred water-soluble cationic azo initiators in the context of the invention include azoamidine compounds, for example 2,2'-azobis(2-methylpropionamidine) dihydrochloride, 2,2'-azobis(2-methyl-N-phenylpropionamidine) dihydrochloride, 2,2'-azobis[N-(4-chlorophenyl)-2-methylpropionamidine] di-hydrochloride, 2,2'-azobis[N-(4-hydroxyphenyl)-2-methyl-propionamidine]dihydrochloride, 2,2'-azobis[N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane] dihydrochloride, 2,2'-azobis[2-(2-imidazolin-2-yl)propane] dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin -2-yl) propane]dihydrochloride and 2,2'-azobis {2-[1-(2-hydroxyethyl)-2-imidazolin-2-yl]propane}dihydrochloride.

2,2'-azobis(2-methylpropionamidine) dihydrochloride is particularly preferably used as the initiator.

The initiator is employed in initiating effective amounts, and preferably is employed in an amount of 0.05 to 2% by weight, in particular of 0.1 to 1% by weight, based on the total amount of the monomers.

Useful monomers for the process according to the invention are the known vinyl esters, in particular vinyl esters of linear and branched monocarboxylic acids having 2 to 12 carbon atoms. Examples include vinyl acetate, vinyl propionate, vinyl butyrate, vinyl pivalate, vinyl 2-ethylhexanoate, and vinyl esters of Versatic® acid 9, 10 or 11 (α,α-dialkyl-branched monocarboxylic acids, Shell Chemie). The content of vinyl esters is preferably at least 50% by weight, in particular 70 to 90% by weight, based on the total amount of monomers employed.

Any monomer that is polymerizable with vinyl esters can be used as optional comonomers. Suitable comonomers include ethylene and esters of acrylic acid or methacrylic acid with an alcohol containing 1 to 12 carbon atoms, for example, methyl acrylate, ethyl acrylate, n-propyl acrylate, n-butyl acrylate, i-butyl acrylate, t-butyl acrylate, n-hexyl acrylate, n-octyl acrylate, 2-ethylhexyl acrylate, methyl methacrylate, ethyl methacrylate, n-propyl methacrylate, n-butyl methacrylate, i-butyl methacrylate, n-octyl methacrylate, and 2-ethylhexyl methacrylate. The content of these comonomers is preferably up to 50% by weight, in particular 5 to 30% by weight, based on the total amount of monomers employed.

Furthermore, monoolefinically unsaturated monocarboxylic acids and dicarboxylic acids, for example acrylic acid, methacrylic acid, maleic acid, fumaric acid and itaconic acid, and mono- and diesters of the dicarboxylic acids, for example maleic acid monomethyl ester and maleic acid mono-2-ethylhexyl ester, and also salts of the above mentioned acids, can be employed. The content of these comonomers is preferably up to 5% by weight, in particular 0.1 to 5% by weight, based on the total amount of monomers employed.

The process according to the invention may be preferably carried out in the complete absence of cationic comonomers, exclusively in the presence of vinyl esters or of vinyl esters and exclusively comonomers from the group consisting of neutral and anionic monomers.

Polyvinyl alcohol is preferably employed as the protective colloid, generally in an amount of 2 to 15% by weight, preferably 4 to 12% by weight, based on the total amount of the monomers. The degree of polymerization of the polyvinyl alcohol is preferably 200 to 3500, in particular between 500 and 3000. The degree of hydrolysis is preferably 80 to 98 mol %, preferably 88 mol %, in particular 85 to 95 mol %.

Further examples of suitable protective colloids include etherified cellulose derivatives, for example hydroxyethyl cellulose, methyl cellulose, carboxymethyl cellulose, starches which are water-soluble or degraded by hydrolysis, and polyvinylpyrrolidone or polycarboxylic acids.

In accordance with the process of this invention, conventional additives, such as non-ionic and/or ionic emulsifiers and/or defoamers can additionally be added.

Examples of non-ionic emulsifiers include ethoxylation products of propylene oxide; alkylpolyglycol ethers, such as the ethoxylation products of lauryl, oleyl, stearyl or coconut fatty alcohol; alkylphenol polyglycol ethers, such as the ethoxylation products of octyl- or nonylphenol, di- or tri-isopropylphenol, or of di- or tert.-butylphenol.

Examples of ionic emulsifiers primarily include anionic emulsifiers. Use is made of the alkali or ammonium salts of alkyl-, aryl- or alkylaryl-sulfonic acids, and of the corresponding sulfates, phosphates or phosphonates, which may also contain units of oligo- or polyethylene oxides between the hydrocarbon group and the anionic group. Typical examples include sodium lauryl sulfate, sodium octylphenolglycol ether sulfates, sodium dodecylbenzene sulfonate, sodium lauryl diglycol sulfate, ammonium tri-tert.-butylphenol pentaglycol sulfate or octaglycol sulfate.

Suitable dofoamers are, for example, those based on silicone or hydrocarbons.

The reaction mixture preferably should have a pH in the range of 4 to 7, in particular of 3 to 6. Adjustment of the pH can, for example, be performed with sodium acetate or sodium hydrogen carbonate.

The process can be carried out as a batch, feed, or continuous process.

Preference is given to the seed latex process. In this process, a portion of the total amount of monomer (as a rule, 1 to 20%) is initially introduced in the form of an emulsion and, following addition of a portion of the total amount of initiator (as a rule, 5 to 30%), is subjected to pre polymerization to give a seed latex. Then the remainder of the monomer mixture and the remainder of the initiator solution are slowly metered in.

The polymerization temperature is preferably 40 to 90° C., in particular 60 to 80° C.

Dispersions having a solids content of at least 45% by weight are preferably achieved by the process according to the invention. In particular, solids contents of between 50 and 75% by weight, particularly preferably between 60 and 70% by weight, are reached.

The invention also relates to polymer dispersions which are stabilized with protective colloids, have a solids content of at least 45% by weight, and are obtainable by the above-described process, preferably by polymerization of exclusively vinyl esters or of vinyl esters with exclusively further comonomers from the group consisting of neutral and anionic monomers, by means of water-soluble cationic azo initiators.

The dispersions prepared according to the invention can be employed as desired, for example, for modifying building materials, for example tile adhesives, composite thermal insulation adhesive and filling compositions, plasters and repair mortars.

Plastics powders which are very readily redispersible can be prepared by methods known per se, for example, by spray drying from the dispersions prepared according to the invention. Such plastics powders can likewise be employed in hydraulically setting building materials and in colored powder coatings.

The invention therefore also relates to the use of the polyvinyl ester dispersions prepared by the process according to the invention as binders in building materials and for the preparation of redispersible dispersion powders, preferably for use in building materials and colored powder coatings.

The powders obtained from the polyvinyl ester dispersions prepared according to the invention have a higher storage stability than powders accessible by standard processes.

The following examples serve to illustrate the invention in more detail. The examples are illustrative only and do not limit the scope of the invention. The parts and percentages stated relate to the weight, unless noted otherwise.

EXAMPLE 1

The amount of completely desalinated water stated in the following table is initially introduced into a 4 l glass flask which is in a heating bath and is equipped with a stirrer, reflux condenser, dropping funnel, and thermometer.

While stirring (130 rpm),

| | | |
|---|---|---|
| 117.5 | parts | of polyvinyl alcohol (viscosity of a 4% strength solution at 20° C.: 8 mPa.s, degree of hydrolysis: 88 mol%, degree of polymerization: 1400), |
| 1.0 | part | of sodium lauryl sulfate (Texapon ® K12, Henkel) |
| 3.3 | parts | of an ethylene oxide/propylene oxide block polymer with 20% of ethylene oxide (Genapol ® PF20, Hoechst AG), |
| 1.0 | part | of a defoamer based on a combination of liquid hydrocarbons, hydrophobic silicic acid, synthetic copolymers and nonionic emulsifiers (Agitan ® 280, Munzing Chemie) and |
| 2.65 | parts | of sodium acetate are added, and the mixture is heated up to an internal temperature of 70° C. (polymerization liquor). |

Furthermore, a monomer mixture comprising

| | |
|---|---|
| 580 | parts of vinyl acetate, |
| 580 | parts of the vinyl ester of Versatic acid 10 (VeoVa10 ®, Shell-Chemie) and |
| 130 | parts of n-butyl acrylate and an initiator solution comprising |

| | |
|---|---|
| 2.1 | parts of 2,2'-azobis(2-methylpropionamidine) dihydrochloride (V-50 ®, Wako Chemicais) in |
| 41.5 | parts of completely desalinated water are prepared. |

130 parts of monomer mixture are added to the polymerization liquor which has been heated up to an internal temperature of 70° C. As soon as the internal temperature has reached 70° C. Again, 8 parts of initiator solution are added and prepolymerization is carried out for 15 minutes.

The monomer mixture and, in parallel with this, 30 parts of the initiator solution are then metered in at 70° C. in the course of 3 hours. After the end of the metering, the remaining amount of initiator solution is added. The mixture is heated to 80° C. and allowed to after-react at this temperature for 1 hour.

After cooling to 50° C., solutions of 1.8 parts of tert-butyl hydroperoxide, 70% strength (Trigonox® A-W 70, Akzo) in 35 parts of completely desalinated water and 1.3 parts of sodium hydroxymethanesulfinate (Rongalit® C, BASF) in 35 parts of completely desalinated water are metered in over a period of 15 minutes. Thereafter, the mixture is cooled.

The solids content, sieve residue (filtration through a 40 μm sieve) and particle size distribution (aerosol spectroscopy) of the dispersions prepared were determined and are reported in the following Table.

| No. | Amount of water initially introduced [parts] | Solids [%] (found) | Sieve residue [%] (40 μm sieve) | Particle size distribution dw [nm] | dw/dn |
|---|---|---|---|---|---|
| 1 | 1590 | 44.9 | 0.274 | 569 | 3.43 |
| 2 | 1459 | 46.8 | 0.087 | 872 | 5.23 |
| 3 | 1338 | 49.0 | 0.065 | 843 | 4.83 |
| 4 | 1174 | 51.8 | 0.056 | 1596 | 10.50 |
| 5 | 1060 | 53.8 | 0.017 | 1472 | 11.85 |
| 6 | 927 | 56.9 | 0.013 | 1335 | 9.73 |
| 7 | 807 | 60.0 | 0.005 | 1328 | 9.92 |
| 8 | 636 | 64.2 | 0.002 | 1746 | 12.79 |

Dispersions with a high solids content are obtained. In these examples, the minimum solids content is about 45%. The sieve residue decreases as the solids content increases. The particles of dispersions with a high solids content are larger compared with those of lower solids content, and the distribution is broader.

EXAMPLE 2

Dispersions analogous to those in Example 1 were prepared, except a polyvinyl alcohol having the following specification was employed as protective colloid:

Viscosity of a 4% strength solution at 20° C.: 4 mPa·s,

Degree of hydrolysis: 88 mol %

Degree of polymerization: 630

| No. | Amount of water initially introduced [parts] | Solids [%] (found) | Sieve residue [%] (40 μm sieve) | Particle size distribution dw [nm] | dw/dn |
|---|---|---|---|---|---|
| 9 | 927 | 57.2 | 0.032 | 1256 | 7.19 |
| 10 | 807 | 60.3 | 0.012 | 1373 | 9.04 |
| 11 | 636 | 64.5 | 0.018 | 1272 | 7.25 |

When the low molecular weight polyvinyl alcohol is employed, the minimum solids content is about 57%.

EXAMPLE 3

A dispersion was prepared as described in Example 1 No. 7, but the following polyvinyl alcohol mixture was employed as the protective colloid system:

| | |
|---|---|
| 40 parts | of polyvinyl alcohol (viscosity of a 4% strength solution at 20° C.: 8 mPa.s, degree of hydrolysis: 88 mol %, degree of polymerization: 1400) |
| and | |
| 77.5 parts | of polyvinyl alcohol (viscosity of a 4% strength solution at 20° C.: 4 mPa.s, degree of hydrolysis: 88 mmol %, degree of polymerization: 630) |

The solids content, sieve residue, and particle size distribution are summarized below:

| No. | Solids [%] (found) | Sieve residue [%] (40 μm sieve) | Particle size distribution dw [nm] | dw/dn |
|---|---|---|---|---|
| 12 | 59.7 | 0.007 | 1769 | 10.21 |

The viscosity of the dispersion was determined at various shear gradients using a rotary viscometer (VT 500 from Haake):

| Shear gradient D [second$^{-1}$] | Viscosity [mPa.s] |
|---|---|
| 10.71 | 5520 |
| 17.93 | 4830 |
| 29.93 | 4430 |
| 58.44 | 3910 |
| 83.20 | 3620 |
| 139.1 | 3090 |
| 231.7 | 2700 |

EXAMPLE 4

A dispersion was prepared analogously to No. 7 from Example 1, but the protective colloid system, initiator and polymerization conditions were changed as follows:

Protective Colloid System

| | |
|---|---|
| 40.0 parts | of polyvinyl alcohol (viscosity of a 4% strength solution at 20° C.: 8 mPa.s, degree of hydrolysis: 88 mol %, degree of polymerization: 1400) |
| and | |

-continued

| | |
|---|---|
| 77.5 parts | of polyvinyl alcohol (viscosity of a 4% strength solution at 20° C.: 4 mPa.s, degree of hydrolysis: 88 mol %, degree of polymerization: 630) |

Initiator 2.1 parts of 2,2'-azobis[2-(2-imidazolin-2-yl)propane] dihydrochloride Polymerization Conditions

| | |
|---|---|
| Polymerization temperature: | 60° C. |
| Duration of prepolymerization: | 30 minutes |
| Metering time: | 5 hours |
| Inert gas: | Nitrogen |

The solids content, sieve residue, particle size distribution, and the viscosity of the dispersion were determined:

| | Solids | Sieve residue | Particle size distribution | |
|---|---|---|---|---|
| No. | [%] (found) | [%] | dw [nm] | dw/dn |
| 13 | 60.3 | 0.008 | 1343 | 9.29 |

| Shear gradient D [second$^{-1}$] | Viscosity [mPa.s] |
|---|---|
| 10.71 | 4230 |
| 17.93 | 3750 |
| 29.93 | 3530 |
| 58.44 | 3320 |
| 83.21 | 3240 |
| 139.1 | 3070 |
| 231.7 | 2820 |

EXAMPLE 5 (Comparison)

Dispersions were prepared as described in Example 1, but the following initiator solution was employed:

2.1 parts of ammonium peroxodisulfate in 41.5 parts of completely desalinated water The polymerization was carried out at 80° C. The half-life of ammonium peroxodisulfate at 80° C. approximately corresponds to that of 2,2'-azobis(2-methylpropionamidine) dihydrochloride at 70° C.

| | Amount of water initially introduced | Solids [%] | Sieve residue | Particle size distribution | |
|---|---|---|---|---|---|
| No. | [parts] | (found) | [%] (40 μm sieve) | dw [nm] | dw/dn |
| 14 | 1800 | 41.9 | 0.104 | 2618 | 21.65 |
| 15 | 1590 | 44.7 | cannot be filtered | dilatant | |
| 16 | 1459 | 46.6 | cannot be filtered | dilatant | |

| Shear gradient D [second$^{-1}$] | Viscosity [mPa.s] Dispersion 14 | Dispersion 15 |
|---|---|---|
| 10.71 | — | 18200 |
| 17.93 | 2500 | 17600 |
| 29.93 | 2330 | 16300 |
| 58.44 | 2070 | — |
| 83.21 | 1900 | — |
| 139.1 | 1630 | — |
| 231.7 | 1500 | — |

When ammonium peroxodisulfate is employed as the initiator, dilatant dispersions are obtained at a solids content from about 45%.

Spray drying of dispersions 7, 12 and 14 described in Examples 1, 3 and 5 and use of the isolated dispersion powders in hydraulically setting building materials:

In each case 5%, based on the solids, of polyvinyl alcohol (viscosity of a 4% strength solution at 20° C.: 4 mPa·s, degree of hydrolysis: 88 mol %, degree of polymerization: 630) as a 25% strength solution, was added to the dispersions 7, 12, and 14.

The dispersions were diluted to a solids content of 40% by weight with deionized water and spray dried, with the addition of an anticaking agent combination of talc and dolomite (spray dryer from Niro, intake temperature: 130° C., discharge temperature: 65° C., throughput: 1 kg/hour). The anticaking agent content was 12% by weight.

The cement compatibility of the dispersion powders was determined as follows:

500 parts of Portland cement PZ 35 are mixed in the dry state with 1500 parts of standard sand and 50 parts of dispersion powder and the mixture is then stirred with 250 parts of water. The slump is determined in accordance with DIN 18 555 part 2 immediately after the cement mortar containing the dispersion powder has been prepared and 15 and 30 minutes after the preparation. The cement compatibility of the dispersion powder is better the greater the slump of the cement mortar and the slower its decrease over time.

The results are summarized in the following table:

| Powder from | Slump [cm] | | |
|---|---|---|---|
| Dispersion No. | Immediately | after 15 minutes | after 30 minutes |
| 7 | 20.2 | 19.3 | 19.2 |
| 12 | 20.6 | 19.5 | 18.9 |
| 14 (comparison) | 15.5 | 13.6 | 12.7 |

The clearly better cement compatibility of the dispersion powders prepared according to the invention can be seen.

EXAMPLE 6

The following solution (polymerization liquor) is prepared, by heating up to an internal temperature of 80° C., in a glass flask which is in a heating bath and is equipped with a stirrer, reflux condenser, dropping funnel and thermometer:

| | |
|---|---|
| 1210 parts | of completely desalinated water, |
| 78 parts | of polyvinyl alcohol (viscosity of a 4% strength solution at 20° C.: 18 mPa.s, degree of hydrolysis: 88 mol %, degree of polymerization: 2700), |
| 39 parts | of polyvinyl alcohol (viscosity of a 4% strength solution at 20° C.: 8 mPa.s, |

-continued

|   | degree of hydrolysis: 88 mol %, degree of polymerization: 1400), |
|---|---|
| 1 part | of sodium lauryl sulfate, |
| 2.6 parts | of sodium acetate, |
| 0.6 part | of a defoamer based on a combination of vegetable oils, modified fat substances, nonionic emulsifiers and silicone oil (Agitan ® 301, Munzig Chemie). |

After the polymerization liquor has cooled to 65° C., first

| 1 part | of 2,2'-azobis(2-methylpropionamidine) di-hydrochloride in |
|---|---|
| 5 parts | of completely desalinated water and then |
| 58 parts | of vinyl acetate |
| are added. | |

The internal temperature drops to about 62° C. As soon as a temperature of 68° C. is reached, 1254 parts of vinylacetate are metered in over a period of 3 hours, the internal temperature being kept at 72 to 74° C.

After the end of the metering,

| 0.32 part | of ammonium peroxodisulfate in |
|---|---|
| 15 parts | of completely desalinated water | are added, the temperature rising briefly to about 77° C. Thereafter, in succession,

| 0.63 parts | of ammonium peroxodisulfate in |
|---|---|
| 15 parts | of completely desalinated water and |
| 0.63 part | of Rongalit C ® in |
| 15 parts | of completely desalinated water |
| are added. | |

The following solution is added at an internal temperature of 65° C.:

28 parts of polyvinyl alcohol (viscosity of a 4% strength solution at 20° C.: 18 mPa·s, degree of hydrolysis: 88 mol %, degree of polymerization: 2700)

6 parts of polyvinyl alcohol (viscosity of a 4% strength solution at 20° C.: 8 mPa·s, degree of hydrolysis: 88 mol %, degree of polymerization: 1400)

0.3 part of sodium lauryl sulfate, in 184 parts of completely desalinated water

The solids content, viscosity, sieve residue, and particle size distribution of the dispersion were determined:

| No. | Solids [%] (found) | Viscosity [mPa.s] (D = 17.93s⁻¹/ 83.21s⁻¹) | Sieve residue [%] (40 μm sieve) | Particle size distribution | |
|---|---|---|---|---|---|
|   |   |   |   | dw [nm] | dw/dn |
| 17 | 50.1 | 11500/8070 | 0.013 | 1807 | 10.22 |

For comparison, a dispersion was prepared using the same amount of ammonium peroxodisulfate. The polymerization was carried out at an internal temperature of 82 to 84° C. (comparable half-lives of the initiators).

| No. | Solids [%] (found) | Viscosity [mPa.s] (D = 17.93s⁻¹/ 83.21s⁻¹) | Sieve residue [%] (40 μm sieve) | Particle size distribution | |
|---|---|---|---|---|---|
|   |   |   |   | dw [nm] | dw/dn |
| 18 | 50.0 | 13000/8590 | 0.024 | 1911 | 12.34 |

The dispersions 17 and 18 were diluted to a solids content of 35% with deionized water and spray dried. The dispersion powders isolated were mixed with 0.2% of a hydrophobic silicic acid.

The storage stability of the powders was determined as follows:

The dispersion powder was introduced into a crystallizing dish of 5 cm diameter and 3 cm height and placed in a drying cabinet at 50° C. for 24 hours.

While the powder isolated from the dispersion 18 (comparison) had caked together significantly, the powder according to the invention obtained by spray drying the dispersion 17 was in unchanged form after the forced storage.

German Application No. 195 31 515.4 filed Aug. 26, 1995, which is the priority application of the current application, is hereby incorporated by reference in its entirety.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A process for the preparation of a dispersion powder from a dispersion having a solids content of at least 45% by weight, which consists essentially of a homopolymer or copolymer of a vinyl ester and is stabilized with a protective colloid consisting essentially of polyvinyl alcohol, said process consisting essentially of polymerizing monomers consisting of the following:
a) at least one vinyl ester of a linear or branched monocarboxylic acid monomer having 2 to 12 carbon atoms; and
b) optional further monomers which can be copolymerized with said vinyl ester using a polymerization initiator consisting of a water-soluble cationic azo compound, wherein said polymerizing is conducted in the presence of the protective colloid consisting essentially of polyvinyl alcohol and in the complete absence of catonic comonomers, and wherein said polyvinyl alcohol is employed as the protective colloid in an amount of 4 to 15% by weight, based on the total weight of said monomers, and spray drying said dispersion.

2. A process as claimed in claim 1, wherein the azo compound comprises an azo amidine compound.

3. A process as claimed in claim 1, wherein the azo compound comprises 2,2'-azobis(2-methylpropionamidine) dihydrochloride.

4. A process as claimed in claim 1, wherein the degree of polymerization of the polyvinyl alcohol is 200 to 3500 and the degree of hydrolysis is 80 to 98 mol %.

5. A polymer dispersion having a solids content of at least 45% by weight, which consists essentially of a homopolymer or copolymer of a vinyl ester and is stabilized with a protective colloid consisting essentially of polyvinyl alcohol, wherein said dispersion is obtained by a process consisting essentially of polymerizing monomers consisting of the following:
a) at least one vinyl ester of a linear or branched monocarboxylic acid monomer having 2 to 12 carbon atoms; and
b) optional further monomers which can be copolymerized with said vinyl ester using a polymerization initiator consisting of a water-soluble cationic azo compound, wherein said polymerizing is conducted in the presence of the protective colloid consisting essentially of polyvinyl alcohol and in the complete absence of catonic comonomers, and wherein said polyvinyl alcohol is employed as the protective colloid in an amount of 4 to 15% by weight, based on the total weight of said monomers, and spray drying said dispersion.

6. A polymer dispersion as claimed in claim 5, wherein the solids content of the dispersion is between 60 and 70% by weight.

7. A redispersible dispersion powder prepared by spray drying a dispersion having a solids content of at least 45% by weight, which consists essentially of a homopolymer or copolymer of a vinyl ester and is stabilized with a protective colloid consisting essentially of polyvinyl alcohol, wherein said dispersion is obtained by a process consisting essentially of polymerizing monomers consisting of the following:
a) at least one vinyl ester of a linear or branched monocarboxylic acid monomer having 2 to 12 carbon atoms; and
b) optional further monomers which can be copolymerized with said vinyl ester using a polymerization initiator consisting of a water-soluble cationic azo compound, wherein said polymerizing is conducted in the presence of the protective colloid consisting essentially of polyvinyl alcohol and in the complete absence of catonic comonomers, and wherein said polyvinyl alcohol is employed as the protective colloid in an amount of 4 to 15% by weight, based on the total weight of said monomers.

8. A binder for building materials, comprising a polymer dispersion having a solids content of at least 45% by weight, which consists essentially of a homopolymer or copolymer of a vinyl ester and is stabilized with a protective colloid consisting essentially of polyvinyl alcohol, wherein said dispersion is obtained by a process consisting essentially of polymerizing monomers consisting of the following:
a) at least one vinyl ester of a linear or branched monocarboxylic acid monomer having 2 to 12 carbon atoms; and
b) optional further monomers which can be copolymerized with said vinyl ester using a polymerization initiator consisting of a water-soluble cationic azo compound, wherein said polymerizing is conducted in the presence of the protective colloid consisting essentially of polyvinyl alcohol and in the complete absence of catonic comonomers, and wherein said polyvinyl alcohol is employed as the protective colloid in an amount of 4 to 15% by weight, based on the total weight of said monomers.

9. A process as claimed in claim 1, wherein 0.05 to 2% by weight of the azo compound is used, based on the weight of said at least one vinyl ester of a linear or branched monocarboxylic acid monomer and said optional further monomers.

10. A process as claimed in claim 1, wherein at least 50% by weight of said at least one vinyl ester of a linear or branched monocarboxylic acid monomer and said optional further monomers are vinyl esters.

11. A process as claimed in claim 1; wherein said other comonomers are used, and which are at least one selected from the group consisting of ethylene and esters of acrylic acid or methacrylic acid.

12. A process as claimed in claim 1, wherein the vinyl ester comprises vinyl acetate.

13. A process as claimed in claim 1, wherein 70 to 95% of said at least one vinyl ester of a linear or branched monocarboxylic acid monomer and said optional further monomers are vinyl esters.

14. A process as claimed in claim 1, wherein said other comonomers are used and are one or more monoolefinically unsaturated acids or dicarboxylic acids or mono- or diesters of the dicarboxylic acids, or salt of the acids.

15. A process as claimed in claim 1, wherein the polymerizing takes place at a temperature of 40 to 90° C.

16. A process as claimed in claim 1, wherein 1 to 20% by weight of the total weight of monomers used is initially introduced in the form of an emulsion, followed by the addition of 5 to 30% by weight of the total weight of initiators used.

17. A process as claimed in claim 1, where the dispersion has a solids content of between 50 and 75% by weight.

18. A process as claimed in claim 1, wherein the polymerizing is a seed latex polymerization, wherein a portion of the total amount of monomers are initially introduced into the protective colloid in the form of an emulsion and, following addition of a portion of the total amount of initiator, are subject to prepolymerization to give a seed latex, and then the remainder of the monomers and initiator are added to the seed latex and polymerized.

19. A process as claimed in claim 1, wherein said optional further monomers are employed and are selected from the group consisting of neutral and anionic monomers.

* * * * *